(12) United States Patent
Cox et al.

(10) Patent No.: US 11,413,924 B2
(45) Date of Patent: *Aug. 16, 2022

(54) METHODS AND APPARATUS FOR SELECTIVE SPRING PRE-LOAD ADJUSTMENT

(71) Applicant: Fox Factory, Inc., Duluth, GA (US)

(72) Inventors: Christopher Paul Cox, Capitola, CA (US); Michael David Marquez, Santa Cruz, CA (US); Everet Ericksen, Woodland, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,091

(22) Filed: Sep. 11, 2019

(65) Prior Publication Data
US 2020/0001676 A1 Jan. 2, 2020

Related U.S. Application Data

(63) Continuation of application No. 15/623,914, filed on Jun. 15, 2017, now Pat. No. 10,414,236, which is a
(Continued)

(51) Int. Cl.
*B60G 17/02* (2006.01)
*B60G 15/06* (2006.01)
(Continued)

(52) U.S. Cl.
CPC ............ *B60G 17/021* (2013.01); *B60G 11/14* (2013.01); *B60G 15/063* (2013.01); *F16F 1/121* (2013.01);
(Continued)

(58) Field of Classification Search
CPC .... B60G 17/021; B60G 11/14; B60G 15/063; B60G 2204/1242; B60G 2204/61;
(Continued)

(56) References Cited

U.S. PATENT DOCUMENTS 435,995 A 9/1890 Dunlop
1,492,731 A 5/1924 Kerr
(Continued)

FOREIGN PATENT DOCUMENTS

DE 3532292 A1 3/1987
DE 3709447 A1 10/1988
(Continued)

OTHER PUBLICATIONS

Electronic Translation of DE3709447A1.
(Continued)

*Primary Examiner* — Robert A. Siconolfi
*Assistant Examiner* — James K Hsiao (57) ABSTRACT

A method and apparatus for a suspension comprising a spring having a threaded member at a first end for providing axial movement to the spring as the spring is rotated and the threaded member moves relative to a second component. In one embodiment, the system includes a damper for metering fluid through a piston and a rotatable spring member coaxially disposed around the damper and rotatable relative to the damper.

10 Claims, 4 Drawing Sheets

Related U.S. Application Data continuation of application No. 14/853,566, filed on Sep. 14, 2015, now Pat. No. 9,682,604, which is a continuation of application No. 12/727,915, filed on Mar. 19, 2010, now Pat. No. 9,140,325.

(60) Provisional application No. 61/161,552, filed on Mar. 19, 2009, provisional application No. 61/161,620, filed on Mar. 19, 2009.

(51) Int. Cl.
*F16F 9/32* (2006.01)
*F16F 9/56* (2006.01)
*F16F 1/12* (2006.01)
*B60G 11/14* (2006.01)

(52) U.S. Cl.
CPC .......... *F16F 9/3264* (2013.01); *F16F 9/56* (2013.01); *B60G 2204/1242* (2013.01); *B60G 2204/61* (2013.01); *B60G 2500/30* (2013.01); *B60G 2600/04* (2013.01); *F16F 2228/08* (2013.01)

(58) Field of Classification Search
CPC . B60G 2500/30; B60G 2600/04; F16F 1/121; F16F 9/3264; F16F 9/56; F16F 2228/08
See application file for complete search history.

(56) References Cited

U.S. PATENT DOCUMENTS

| | | |
|---|---|---|
| 1,575,973 A | 3/1926 | Coleman |
| 1,655,786 A | 1/1928 | Guerritore et al. |
| 1,923,011 A | 8/1933 | Moulton |
| 1,948,600 A | 2/1934 | Templeton |
| 2,018,312 A | 10/1935 | Moulton |
| 2,115,072 A | 4/1938 | Hunt et al. |
| 2,259,437 A | 10/1941 | Dean |
| 2,492,331 A | 12/1949 | Spring |
| 2,540,525 A | 2/1951 | Howarth et al. |
| 2,559,633 A | 7/1951 | Maurice et al. |
| 2,697,600 A | 12/1954 | Gregoire |
| 2,705,119 A | 3/1955 | Ingwer |
| 2,725,076 A | 11/1955 | Hansen et al. |
| 2,729,308 A | 1/1956 | Koski et al. |
| 2,784,962 A | 3/1957 | Sherburne |
| 2,809,722 A | 10/1957 | Smith |
| 2,838,140 A | 6/1958 | Rasmusson et al. |
| 2,846,028 A | 8/1958 | Gunther |
| 2,879,971 A | 3/1959 | Demay |
| 2,883,181 A | 4/1959 | Hogan et al. |
| 2,897,613 A | 8/1959 | Davidson et al. |
| 2,941,629 A | 6/1960 | Etienne et al. |
| 2,967,065 A | 1/1961 | Schwendner |
| 2,991,804 A | 7/1961 | Merkle |
| 3,003,595 A | 10/1961 | Patriquin et al. |
| 3,056,598 A | 10/1962 | Ransom et al. |
| 3,071,394 A | 1/1963 | John |
| 3,073,586 A | 1/1963 | Hartel et al. |
| 3,074,709 A | 1/1963 | Ellis et al. |
| 3,085,530 A | 4/1963 | Williamson |
| 3,087,583 A | 4/1963 | Bruns |
| 3,202,413 A | 8/1965 | Colmerauer |
| 3,206,153 A | 9/1965 | Burke |
| 3,284,076 A | 11/1966 | Gibson |
| 3,286,797 A | 11/1966 | Leibfritz et al. |
| 3,405,625 A | 10/1968 | Carlson et al. |
| 3,419,849 A | 12/1968 | Anderson et al. |
| 3,420,493 A | 1/1969 | Kraft et al. |
| 3,528,700 A | 9/1970 | Janu et al. |
| 3,537,722 A | 11/1970 | Moulton |
| 3,556,137 A | 1/1971 | Billeter et al. |
| 3,559,027 A | 1/1971 | Arsem |
| 3,560,033 A | 2/1971 | Barkus |
| 3,575,442 A | 4/1971 | Elliott et al. |
| 3,584,331 A | 6/1971 | Richard et al. |
| 3,603,575 A | 9/1971 | Arlasky et al. |
| 3,605,960 A | 9/1971 | Singer |
| 3,621,950 A | 11/1971 | Lutz |
| 3,650,033 A | 3/1972 | Behne et al. |
| 3,701,544 A | 10/1972 | Stankovich |
| 3,714,953 A | 2/1973 | Solvang |
| 3,750,856 A | 8/1973 | Kenworthy et al. |
| 3,784,228 A | 1/1974 | Hoffmann et al. |
| 3,791,408 A | 2/1974 | Saitou et al. |
| 3,830,482 A * | 8/1974 | Norris .................. B60G 17/021 267/286 |
| 3,842,753 A | 10/1974 | Ross et al. |
| 3,861,487 A | 1/1975 | Gill |
| 3,903,613 A | 9/1975 | Bisberg |
| 3,941,402 A | 3/1976 | Yankowski et al. |
| 3,981,204 A | 9/1976 | Starbard et al. |
| 3,986,118 A | 10/1976 | Madigan |
| 4,007,855 A * | 2/1977 | Hierath .................. G01F 11/021 222/26 |
| 4,022,113 A | 5/1977 | Blatt et al. |
| 4,032,829 A | 6/1977 | Schenavar et al. |
| 4,036,335 A | 7/1977 | Thompson et al. |
| 4,072,087 A | 2/1978 | Mueller et al. |
| 4,103,881 A * | 8/1978 | Simich ................... F16F 1/128 248/623 |
| 4,121,610 A | 10/1978 | Harms et al. |
| 4,131,657 A | 12/1978 | Ball et al. |
| 4,139,186 A | 2/1979 | Postema et al. |
| 4,153,237 A | 5/1979 | Supalla |
| 4,159,106 A | 6/1979 | Nyman et al. |
| 4,174,098 A | 11/1979 | Baker et al. |
| 4,183,509 A * | 1/1980 | Nishikawa ........... B60G 15/063 188/319.2 |
| 4,291,850 A | 9/1981 | Sharples |
| 4,305,566 A | 12/1981 | Grawunde |
| 4,333,668 A | 6/1982 | Hendrickson et al. |
| 4,334,711 A | 6/1982 | Mazur et al. |
| 4,337,850 A | 7/1982 | Shimokura et al. |
| 4,348,016 A | 9/1982 | Milly |
| 4,351,515 A | 9/1982 | Yoshida |
| 4,366,969 A | 1/1983 | Benya et al. |
| 4,387,781 A | 6/1983 | Ezell et al. |
| 4,437,548 A | 3/1984 | Ashiba et al. |
| 4,465,299 A | 8/1984 | Stone et al. |
| 4,474,363 A | 10/1984 | Numazawa et al. |
| 4,491,207 A | 1/1985 | Boonchanta et al. |
| 4,500,827 A | 2/1985 | Merritt et al. |
| 4,502,673 A | 3/1985 | Clark et al. |
| 4,529,180 A | 7/1985 | Hill |
| 4,546,959 A | 10/1985 | Tanno |
| 4,548,233 A | 10/1985 | Wolfges |
| 4,550,899 A | 11/1985 | Holley |
| 4,570,851 A | 2/1986 | Cirillo et al. |
| 4,572,317 A | 2/1986 | Isono et al. |
| 4,620,619 A | 11/1986 | Emura et al. |
| 4,624,346 A | 11/1986 | Katz et al. |
| 4,630,818 A | 12/1986 | Saarinen |
| 4,634,142 A | 1/1987 | Woods et al. |
| 4,647,068 A | 3/1987 | Asami et al. |
| 4,655,440 A | 4/1987 | Eckert |
| 4,657,280 A | 4/1987 | Ohmori |
| 4,659,104 A | 4/1987 | Tanaka et al. |
| 4,660,689 A | 4/1987 | Hayashi et al. |
| 4,662,616 A | 5/1987 | Hennells |
| 4,673,194 A | 6/1987 | Sugasawa |
| 4,709,779 A | 12/1987 | Takehara |
| 4,729,459 A | 3/1988 | Inagaki et al. |
| 4,732,244 A | 3/1988 | Verkuylen |
| 4,744,444 A | 5/1988 | Gillingham |
| 4,750,735 A | 6/1988 | Furgerson et al. |
| 4,765,648 A | 8/1988 | Mander et al. |
| 4,773,671 A | 9/1988 | Inagaki |
| 4,786,034 A | 11/1988 | Heess et al. |
| 4,815,575 A | 3/1989 | Murty et al. |
| 4,821,852 A | 4/1989 | Yokoya |
| 4,826,207 A | 5/1989 | Yoshioka et al. |

(56) References Cited

U.S. PATENT DOCUMENTS

| | | | |
|---|---|---|---|
| 4,830,395 A * | 5/1989 | Foley | B60G 17/0272 267/177 |
| 4,836,578 A | 6/1989 | Soltis | |
| 4,838,394 A | 6/1989 | Lemme et al. | |
| 4,838,527 A | 6/1989 | Holley | |
| 4,846,317 A | 7/1989 | Hudgens | |
| 4,858,733 A | 8/1989 | Noguchi et al. | |
| 4,892,328 A | 1/1990 | Kurtzman et al. | |
| 4,919,166 A | 4/1990 | Sims et al. | |
| 4,936,424 A | 6/1990 | Costa | |
| 4,938,228 A | 7/1990 | Righter | |
| 4,949,262 A | 8/1990 | Buma et al. | |
| 4,949,989 A | 8/1990 | Kakizaki et al. | |
| 4,958,706 A | 9/1990 | Richardson et al. | |
| 4,975,849 A | 12/1990 | Ema et al. | |
| 4,984,819 A | 1/1991 | Kakizaki et al. | |
| 5,027,303 A | 6/1991 | Witte | |
| 5,031,455 A | 7/1991 | Cline | |
| 5,036,934 A | 8/1991 | Nishina et al. | |
| 5,040,381 A | 8/1991 | Hazen | |
| 5,044,614 A * | 9/1991 | Rau | B60G 15/067 267/221 |
| 5,060,959 A | 10/1991 | Davis et al. | |
| 5,072,812 A | 12/1991 | Imaizumi | |
| 5,074,624 A | 12/1991 | Stauble et al. | |
| 5,076,404 A | 12/1991 | Gustafsson | |
| 5,080,392 A | 1/1992 | Bazergui | |
| 5,094,325 A | 3/1992 | Smith | |
| 5,105,918 A | 4/1992 | Hagiwara et al. | |
| 5,113,980 A | 5/1992 | Furrer et al. | |
| 5,152,547 A | 10/1992 | Davis | |
| 5,161,653 A | 11/1992 | Hare | |
| 5,161,817 A | 11/1992 | Daum et al. | |
| 5,163,742 A | 11/1992 | Topfer et al. | |
| 5,178,242 A | 1/1993 | Nakamura et al. | |
| 5,186,481 A | 2/1993 | Turner | |
| 5,203,584 A | 4/1993 | Butsuen et al. | |
| 5,207,774 A | 5/1993 | Wolfe et al. | |
| 5,230,364 A | 7/1993 | Leng et al. | |
| 5,236,169 A | 8/1993 | Johnsen et al. | |
| 5,248,014 A | 9/1993 | Ashiba | |
| 5,259,487 A | 11/1993 | Petek et al. | |
| 5,263,559 A | 11/1993 | Mettner | |
| 5,265,902 A | 11/1993 | Lewis | |
| 5,266,065 A | 11/1993 | Ancarani | |
| 5,277,283 A | 1/1994 | Yamaoka et al. | |
| 5,283,733 A | 2/1994 | Colley | |
| 5,284,330 A | 2/1994 | Carlson et al. | |
| 5,293,971 A | 3/1994 | Kanari | |
| 5,295,916 A | 3/1994 | Chattin | |
| 5,307,907 A | 5/1994 | Nakamura et al. | |
| 5,318,066 A | 6/1994 | Burgorf et al. | |
| 5,328,004 A | 7/1994 | Fannin et al. | |
| 5,347,186 A | 9/1994 | Konotchick et al. | |
| 5,348,112 A | 9/1994 | Vaillancourt | |
| 5,372,223 A | 12/1994 | Dekock et al. | |
| 5,372,224 A | 12/1994 | Samonil et al. | |
| 5,381,952 A | 1/1995 | Duprez | |
| 5,390,121 A | 2/1995 | Wolfe | |
| 5,390,949 A | 2/1995 | Naganathan et al. | |
| 5,392,885 A | 2/1995 | Patzenhauer et al. | |
| 5,396,973 A | 3/1995 | Schwemmer et al. | |
| 5,398,787 A | 3/1995 | Woessner et al. | |
| 5,413,196 A | 5/1995 | Forster | |
| 5,467,280 A | 11/1995 | Kimura | |
| 5,480,011 A | 1/1996 | Nagai et al. | |
| 5,487,006 A | 1/1996 | Kakizaki et al. | |
| 5,503,258 A | 4/1996 | Clarke et al. | |
| 5,542,150 A | 8/1996 | Tu | |
| 5,551,674 A | 9/1996 | Johnsen | |
| 5,553,836 A * | 9/1996 | Ericson | B60G 11/16 267/177 |
| 5,578,877 A | 11/1996 | Tiemann | |
| 5,588,510 A | 12/1996 | Wilke | |
| 5,592,401 A | 1/1997 | Kramer | |
| 5,597,180 A | 1/1997 | Ganzel et al. | |
| 5,598,337 A | 1/1997 | Butsuen et al. | |
| 5,599,244 A | 2/1997 | Ethington | |
| 5,601,164 A | 2/1997 | Ohsaki et al. | |
| 5,651,433 A | 7/1997 | Wirth et al. | |
| 5,657,840 A | 8/1997 | Lizell | |
| 5,687,575 A | 11/1997 | Keville et al. | |
| 5,697,477 A | 12/1997 | Hiramoto et al. | |
| 5,699,885 A | 12/1997 | Forster | |
| 5,722,645 A * | 3/1998 | Reitter | B60G 11/16 267/177 |
| 5,803,443 A * | 9/1998 | Chang | B60G 15/063 267/177 |
| 5,806,159 A | 9/1998 | Ohnishi et al. | |
| 5,810,128 A | 9/1998 | Eriksson et al. | |
| 5,813,456 A | 9/1998 | Milner et al. | |
| 5,813,731 A | 9/1998 | Newman et al. | |
| 5,816,281 A | 10/1998 | Mixon | |
| 5,818,132 A | 10/1998 | Konotchick et al. | |
| 5,826,935 A | 10/1998 | Defreitas et al. | |
| 5,828,843 A | 10/1998 | Samuel et al. | |
| 5,829,733 A | 11/1998 | Becker | |
| 5,850,352 A | 12/1998 | Moezzi et al. | |
| 5,853,071 A | 12/1998 | Robinson | |
| 5,872,418 A | 2/1999 | Wischnewskiy | |
| 5,884,921 A | 3/1999 | Katsuda et al. | |
| 5,937,975 A | 8/1999 | Forster | |
| 5,947,238 A | 9/1999 | Jolly et al. | |
| 5,952,823 A | 9/1999 | Sprecher et al. | |
| 5,954,318 A | 9/1999 | Kluhsman | |
| 5,956,951 A | 9/1999 | O'Callaghan | |
| 5,957,252 A | 9/1999 | Berthold | |
| 5,971,116 A | 10/1999 | Franklin | |
| 5,988,332 A * | 11/1999 | Marzocchi | B60G 17/021 188/298 |
| 5,988,655 A | 11/1999 | Sakai et al. | |
| 5,992,450 A | 11/1999 | Parker et al. | |
| 5,996,745 A | 12/1999 | Jones et al. | |
| 5,996,746 A | 12/1999 | Turner et al. | |
| 5,999,868 A | 12/1999 | Beno et al. | |
| 6,000,702 A | 12/1999 | Streiter | |
| 6,013,007 A | 1/2000 | Root et al. | |
| 6,017,047 A | 1/2000 | Hoose | |
| 6,035,979 A | 3/2000 | Forster | |
| 6,050,583 A | 4/2000 | Bohn | |
| 6,058,340 A | 5/2000 | Uchiyama et al. | |
| 6,067,490 A | 5/2000 | Ichimaru et al. | |
| 6,073,536 A | 6/2000 | Campbell | |
| 6,073,700 A | 6/2000 | Tsuji et al. | |
| 6,073,736 A | 6/2000 | Franklin | |
| 6,092,011 A | 7/2000 | Hiramoto et al. | |
| 6,105,988 A | 8/2000 | Turner et al. | |
| 6,131,709 A | 10/2000 | Jolly et al. | |
| 6,135,434 A | 10/2000 | Marking | |
| 6,141,969 A | 11/2000 | Launchbury et al. | |
| 6,151,930 A | 11/2000 | Carlson | |
| 6,152,856 A | 11/2000 | Studor et al. | |
| 6,179,098 B1 | 1/2001 | Hayakawa et al. | |
| 6,196,555 B1 | 3/2001 | Gaibler | |
| 6,199,669 B1 | 3/2001 | Huang et al. | |
| 6,203,026 B1 | 3/2001 | Jones | |
| 6,213,263 B1 | 4/2001 | De Frenne | |
| 6,215,217 B1 | 4/2001 | Kurosawa et al. | |
| 6,217,049 B1 | 4/2001 | Becker | |
| 6,219,045 B1 | 4/2001 | Leahy et al. | |
| 6,244,398 B1 | 6/2001 | Girvin et al. | |
| 6,254,067 B1 | 7/2001 | Yih | |
| 6,279,702 B1 | 8/2001 | Koh | |
| 6,283,462 B1 * | 9/2001 | Emmert | F16F 1/041 267/179 |
| 6,293,530 B1 | 9/2001 | Delorenzis et al. | |
| 6,296,092 B1 | 10/2001 | Marking et al. | |
| 6,311,962 B1 | 11/2001 | Marking | |
| 6,318,525 B1 | 11/2001 | Vignocchi et al. | |
| 6,322,468 B1 | 11/2001 | Wing et al. | |
| 6,336,648 B1 | 1/2002 | Bohn | |
| 6,343,807 B1 | 2/2002 | Rathbun | |
| 6,359,837 B1 | 3/2002 | Tsukamoto et al. | |
| 6,360,857 B1 | 3/2002 | Fox et al. | |

(56) References Cited

U.S. PATENT DOCUMENTS

| | | | |
|---|---|---|---|
| 6,371,262 B1 | 4/2002 | Katou et al. |
| 6,371,267 B1 | 4/2002 | Kao et al. |
| 6,378,816 B1 | 4/2002 | Pfister |
| 6,378,885 B1 | 4/2002 | Ellsworth et al. |
| 6,382,370 B1 | 5/2002 | Girvin |
| 6,389,341 B1 | 5/2002 | Davis |
| 6,390,747 B1 | 5/2002 | Commins |
| 6,401,883 B1 | 6/2002 | Nyce et al. |
| 6,412,788 B1 | 7/2002 | Ichimaru |
| 6,415,895 B2 | 7/2002 | Marking et al. |
| 6,418,360 B1* | 7/2002 | Spivey ................ B62J 50/22 701/33.6 |
| 6,427,812 B2 | 8/2002 | Crawley et al. |
| 6,431,573 B1 | 8/2002 | Lerman et al. |
| 6,434,460 B1 | 8/2002 | Uchino et al. |
| 6,446,771 B1 | 9/2002 | Sintorn et al. |
| 6,458,060 B1 | 10/2002 | Watterson et al. |
| 6,467,593 B1 | 10/2002 | Corradini et al. |
| 6,474,454 B2 | 11/2002 | Matsumoto et al. |
| 6,474,753 B1 | 11/2002 | Rieth et al. |
| 6,501,554 B1 | 12/2002 | Hackney et al. |
| 6,502,837 B1 | 1/2003 | Hamilton et al. |
| 6,510,929 B1 | 1/2003 | Gordaninejad et al. |
| 6,520,297 B1 | 2/2003 | Lumpkin et al. |
| 6,592,136 B2 | 7/2003 | Becker et al. |
| 6,609,686 B2 | 8/2003 | Malizia |
| 6,619,615 B1 | 9/2003 | Mayr et al. |
| 6,623,389 B1 | 9/2003 | Campagnolo |
| 6,648,109 B2 | 11/2003 | Farr et al. |
| 6,659,240 B2 | 12/2003 | Dernebo |
| 6,659,241 B2 | 12/2003 | Sendrea |
| 6,672,687 B2 | 1/2004 | Nishio |
| 6,676,119 B2* | 1/2004 | Becker ............... B60G 17/0272 267/177 |
| 6,691,991 B1* | 2/2004 | Huang ................ B60G 15/063 267/286 |
| 6,701,234 B1 | 3/2004 | Vogelsang et al. |
| 6,732,033 B2 | 5/2004 | Laplante et al. |
| 6,782,980 B2 | 8/2004 | Nakadate |
| 6,817,454 B2 | 11/2004 | Nezu et al. |
| 6,827,184 B1* | 12/2004 | Lin ..................... B60G 11/15 188/321.11 |
| 6,837,827 B1 | 1/2005 | Lee et al. |
| 6,840,257 B2 | 1/2005 | Dario et al. |
| 6,853,955 B1 | 2/2005 | Burrell et al. |
| 6,857,625 B2 | 2/2005 | Löser et al. |
| 6,863,291 B2 | 3/2005 | Miyoshi |
| 6,902,513 B1 | 6/2005 | McClure et al. |
| 6,905,203 B2 | 6/2005 | Kremers et al. |
| 6,920,951 B2 | 7/2005 | Song et al. |
| 6,921,351 B1 | 7/2005 | Hickman et al. |
| 6,923,853 B2 | 8/2005 | Kremers et al. |
| 6,931,958 B2 | 8/2005 | Takeda |
| 6,935,157 B2 | 8/2005 | Miller |
| 6,952,060 B2 | 10/2005 | Goldner et al. |
| 6,959,906 B2 | 11/2005 | Hoenig et al. |
| 6,959,921 B2 | 11/2005 | Rose |
| 6,966,412 B2 | 11/2005 | Braswell et al. |
| 6,978,871 B2 | 12/2005 | Holiviers |
| 6,978,872 B2 | 12/2005 | Turner |
| 6,991,076 B2 | 1/2006 | McAndrews |
| 7,025,367 B2 | 4/2006 | McKinnon et al. |
| 7,076,351 B2 | 7/2006 | Hamilton et al. |
| 7,128,192 B2 | 10/2006 | Fox |
| 7,128,693 B2 | 10/2006 | Brown et al. |
| 7,135,794 B2 | 11/2006 | Kühnel |
| 7,147,207 B2 | 12/2006 | Jordan et al. |
| 7,163,222 B2 | 1/2007 | Becker et al. |
| 7,166,062 B1 | 1/2007 | Watterson et al. |
| 7,166,064 B2 | 1/2007 | Ashby et al. |
| 7,204,466 B2 | 4/2007 | Hsieh |
| 7,207,912 B2 | 4/2007 | Takeda et al. |
| 7,208,845 B2 | 4/2007 | Schaefer et al. |
| 7,217,224 B2 | 5/2007 | Thomas |
| 7,234,575 B2 | 6/2007 | Anderfaas et al. |
| 7,234,680 B2 | 6/2007 | Hull et al. |
| 7,243,763 B2 | 7/2007 | Carlson |
| 7,255,210 B2 | 8/2007 | Larsson et al. |
| 7,270,221 B2 | 9/2007 | McAndrews |
| 7,287,760 B1 | 10/2007 | Quick et al. |
| 7,288,038 B2 | 10/2007 | Takeda et al. |
| 7,289,138 B2 | 10/2007 | Foote et al. |
| 7,292,867 B2 | 11/2007 | Werner et al. |
| 7,293,764 B2* | 11/2007 | Fang ..................... B60G 11/16 267/220 |
| 7,299,112 B2 | 11/2007 | Laplante et al. |
| 7,306,206 B2 | 12/2007 | Turner |
| 7,316,406 B2 | 1/2008 | Kimura et al. |
| 7,325,660 B2 | 2/2008 | Norgaard et al. |
| 7,363,129 B1 | 4/2008 | Barnicle et al. |
| 7,373,232 B2 | 5/2008 | Guderzo |
| 7,374,028 B2 | 5/2008 | Fox |
| 7,397,355 B2 | 7/2008 | Tracy |
| 7,413,063 B1 | 8/2008 | Davis |
| 7,415,336 B1 | 8/2008 | Burch et al. |
| 7,422,092 B2 | 9/2008 | Hitchcock et al. |
| 7,441,638 B2 | 10/2008 | Hanawa |
| 7,469,910 B2 | 12/2008 | Munster et al. |
| 7,484,603 B2 | 2/2009 | Fox |
| 7,490,705 B2 | 2/2009 | Fox |
| 7,523,617 B2 | 4/2009 | Colpitts et al. |
| 7,558,313 B2 | 7/2009 | Feher |
| 7,558,574 B2 | 7/2009 | Feher et al. |
| 7,566,290 B2 | 7/2009 | Lee et al. |
| 7,569,952 B1 | 8/2009 | Bono et al. |
| 7,581,743 B2 | 9/2009 | Graney et al. |
| 7,591,352 B2 | 9/2009 | Hanawa |
| 7,600,616 B2 | 10/2009 | Anderfaas et al. |
| 7,628,259 B2 | 12/2009 | Norgaard et al. |
| 7,631,882 B2 | 12/2009 | Hirao et al. |
| 7,654,369 B2 | 2/2010 | Murray et al. |
| 7,673,936 B2 | 3/2010 | Hsu et al. |
| 7,684,911 B2 | 3/2010 | Seifert et al. |
| 7,694,785 B2 | 4/2010 | Nakadate |
| 7,694,987 B2 | 4/2010 | McAndrews |
| 7,699,753 B2 | 4/2010 | Daikeler et al. |
| 7,703,585 B2 | 4/2010 | Fox |
| 7,722,056 B2 | 5/2010 | Inoue et al. |
| 7,722,069 B2 | 5/2010 | Shirai |
| 7,726,042 B2 | 6/2010 | Meschan |
| 7,730,906 B2 | 6/2010 | Kleinert et al. |
| 7,736,272 B2 | 6/2010 | Martens |
| 7,764,990 B2 | 7/2010 | Martikka et al. |
| 7,766,794 B2 | 8/2010 | Oliver et al. |
| 7,770,701 B1 | 8/2010 | Davis |
| 7,775,128 B2 | 8/2010 | Roessingh et al. |
| 7,779,974 B2 | 8/2010 | Timoney et al. |
| 7,795,711 B2 | 9/2010 | Sauciuc et al. |
| 7,837,213 B2 | 11/2010 | Colegrove et al. |
| 7,840,346 B2 | 11/2010 | Huhtala et al. |
| 7,841,258 B2 | 11/2010 | Komatsu et al. |
| 7,845,602 B1 | 12/2010 | Young et al. |
| 7,857,325 B2 | 12/2010 | Copsey et al. |
| 7,872,764 B2 | 1/2011 | Higgins-Luthman et al. |
| 7,874,567 B2 | 1/2011 | Ichida et al. |
| 7,901,292 B1 | 3/2011 | Uhlir et al. |
| 7,909,348 B2 | 3/2011 | Klieber et al. |
| 7,927,253 B2 | 4/2011 | Dibenedei et al. |
| 7,931,132 B2 | 4/2011 | Braun |
| 7,931,563 B2 | 4/2011 | Shaw et al. |
| 7,946,163 B2 | 5/2011 | Gartner |
| 7,975,814 B2 | 7/2011 | Soederdahl |
| 8,016,349 B2 | 9/2011 | Mouri et al. |
| 8,021,270 B2 | 9/2011 | D'Eredita |
| 8,042,427 B2 | 10/2011 | Kawakami et al. |
| 8,056,392 B2 | 11/2011 | Ryan et al. |
| 8,069,964 B2 | 12/2011 | Deferme et al. |
| 8,087,676 B2 | 1/2012 | McIntyre |
| 8,091,910 B2 | 1/2012 | Hara et al. |
| 8,104,591 B2 | 1/2012 | Barefoot et al. |
| 8,121,757 B2 | 2/2012 | Extance et al. |
| 8,121,785 B2 | 2/2012 | Swisher et al. |
| 8,127,900 B2 | 3/2012 | Inoue |
| 8,136,877 B2 | 3/2012 | Walsh et al. |

(56) References Cited

U.S. PATENT DOCUMENTS

| | | | |
|---|---|---|---|
| 8,141,438 B2 | 3/2012 | Roessingh et al. | |
| 8,151,952 B2 | 4/2012 | Lenz et al. | |
| 8,157,629 B2 | 4/2012 | Yanke et al. | |
| 8,191,964 B2 | 6/2012 | Hsu et al. | |
| 8,201,476 B2 | 6/2012 | Miyama | |
| 8,205,864 B2 * | 6/2012 | Michel | H02K 41/02 267/218 |
| 8,210,106 B2 | 7/2012 | Tai et al. | |
| 8,210,330 B2 | 7/2012 | Vandewal | |
| 8,246,065 B1 | 8/2012 | Kodama et al. | |
| 8,256,587 B2 | 9/2012 | Bakke et al. | |
| 8,256,732 B1 | 9/2012 | Young et al. | |
| 8,262,062 B2 | 9/2012 | Kamo et al. | |
| 8,262,100 B2 | 9/2012 | Thomas | |
| 8,285,447 B2 | 10/2012 | Bennett et al. | |
| 8,286,982 B2 | 10/2012 | Plan et al. | |
| 8,291,889 B2 | 10/2012 | Shafer et al. | |
| 8,292,274 B2 | 10/2012 | Adoline et al. | |
| 8,307,965 B2 | 11/2012 | Föster et al. | |
| 8,308,124 B2 | 11/2012 | Hsu | |
| 8,317,261 B2 | 11/2012 | Walsh et al. | |
| 8,328,454 B2 | 12/2012 | McAndrews et al. | |
| 8,336,683 B2 | 12/2012 | McAndrews et al. | |
| 8,364,389 B2 | 1/2013 | Dorogusker et al. | |
| 8,393,446 B2 | 3/2013 | Haugen | |
| 8,413,773 B2 | 4/2013 | Anderfaas et al. | |
| 8,423,244 B2 | 4/2013 | Proemm et al. | |
| 8,430,770 B2 | 4/2013 | Dugan et al. | |
| 8,458,080 B2 | 6/2013 | Shirai | |
| 8,459,619 B2 | 6/2013 | Trinh et al. | |
| 8,480,064 B2 | 7/2013 | Talavasek | |
| 8,550,551 B2 | 10/2013 | Shirai | |
| 8,556,048 B2 | 10/2013 | Maeda et al. | |
| 8,556,049 B2 | 10/2013 | Jee | |
| 8,596,663 B2 | 12/2013 | Shirai et al. | |
| 8,622,180 B2 | 1/2014 | Wootten et al. | |
| 8,627,932 B2 | 1/2014 | Marking | |
| 8,641,073 B2 | 2/2014 | Lee et al. | |
| 8,655,548 B2 | 2/2014 | Ichida et al. | |
| 8,727,947 B2 | 5/2014 | Tagliabue | |
| 8,744,699 B2 | 6/2014 | Hamaguchi et al. | |
| 8,752,682 B2 | 6/2014 | Park et al. | |
| 8,763,770 B2 | 7/2014 | Marking | |
| 8,770,357 B2 | 7/2014 | Sims et al. | |
| 8,781,680 B2 | 7/2014 | Ichida et al. | |
| 8,781,690 B2 | 7/2014 | Hara et al. | |
| 8,814,109 B2 | 8/2014 | Calendrille et al. | |
| 8,833,786 B2 | 9/2014 | Camp et al. | |
| 8,838,335 B2 | 9/2014 | Bass et al. | |
| 8,845,496 B2 | 9/2014 | Arrasvuori et al. | |
| 8,857,580 B2 | 10/2014 | Marking | |
| 8,868,253 B2 | 10/2014 | Hashimoto et al. | |
| 8,888,115 B2 | 11/2014 | Chubbuck et al. | |
| 8,909,424 B2 | 12/2014 | Jordan et al. | |
| 8,936,139 B2 | 1/2015 | Galasso et al. | |
| 8,950,771 B2 | 2/2015 | Felsl et al. | |
| 8,955,653 B2 | 2/2015 | Marking | |
| 8,967,343 B2 | 3/2015 | Battlogg et al. | |
| 8,991,571 B2 | 3/2015 | Murakami | |
| 9,033,122 B2 | 5/2015 | Ericksen et al. | |
| 9,038,791 B2 | 5/2015 | Marking | |
| 9,057,416 B2 | 6/2015 | Talavasek | |
| 9,073,592 B2 | 7/2015 | Hsu | |
| 9,103,400 B2 | 8/2015 | Becker | |
| 9,108,098 B2 | 8/2015 | Galasso et al. | |
| 9,120,362 B2 | 9/2015 | Marking | |
| 9,126,647 B2 | 9/2015 | Kuo | |
| 9,140,325 B2 | 9/2015 | Cox et al. | |
| 9,157,523 B2 | 10/2015 | Miki et al. | |
| 9,186,949 B2 | 11/2015 | Galasso et al. | |
| 9,194,456 B2 | 11/2015 | Laird et al. | |
| 9,199,690 B2 | 12/2015 | Watarai | |
| 9,229,712 B2 | 1/2016 | Takamoto et al. | |
| 9,239,090 B2 | 1/2016 | Marking et al. | |
| 9,278,598 B2 | 3/2016 | Galasso et al. | |
| 9,353,818 B2 | 5/2016 | Marking | |
| 9,366,307 B2 | 6/2016 | Marking | |
| 9,422,018 B2 | 8/2016 | Pelot et al. | |
| 9,452,654 B2 | 9/2016 | Ericksen et al. | |
| 9,523,406 B2 | 12/2016 | Galasso et al. | |
| 9,550,405 B2 | 1/2017 | Marking et al. | |
| 9,556,925 B2 | 1/2017 | Marking | |
| 9,616,728 B2 | 4/2017 | Marking | |
| 9,650,094 B2 | 5/2017 | Laird et al. | |
| 9,663,181 B2 | 5/2017 | Ericksen et al. | |
| 9,682,604 B2 * | 6/2017 | Cox | F16F 1/121 |
| 9,784,333 B2 | 10/2017 | Marking | |
| 10,029,172 B2 | 7/2018 | Galasso et al. | |
| 10,036,443 B2 | 7/2018 | Galasso et al. | |
| 10,040,329 B2 | 8/2018 | Ericksen et al. | |
| 10,072,724 B2 | 9/2018 | Haugen et al. | |
| 10,086,670 B2 | 10/2018 | Galasso et al. | |
| 10,094,443 B2 | 10/2018 | Marking | |
| 10,145,435 B2 | 12/2018 | Galasso et al. | |
| 10,591,015 B2 | 3/2020 | Galasso et al. | |
| 10,604,207 B2 * | 3/2020 | Winefordner | B60G 11/16 |
| 2001/0017334 A1 | 8/2001 | Vincent | |
| 2001/0022621 A1 | 9/2001 | Squibbs | |
| 2001/0030408 A1 | 10/2001 | Miyoshi et al. | |
| 2001/0042663 A1 | 11/2001 | Marking et al. | |
| 2001/0055373 A1 | 12/2001 | Yamashita | |
| 2002/0000352 A1 | 1/2002 | Matsumoto et al. | |
| 2002/0032508 A1 | 3/2002 | Uchino et al. | |
| 2002/0045987 A1 | 4/2002 | Ohata et al. | |
| 2002/0050112 A1 | 5/2002 | Koch et al. | |
| 2002/0050518 A1 | 5/2002 | Roustaei | |
| 2002/0055422 A1 | 5/2002 | Airmet et al. | |
| 2002/0063469 A1 | 5/2002 | Nishio | |
| 2002/0089107 A1 | 7/2002 | Koh | |
| 2002/0113347 A1 | 8/2002 | Robbins et al. | |
| 2002/0121416 A1 | 9/2002 | Katayama et al. | |
| 2002/0130000 A1 | 9/2002 | Lisenker et al. | |
| 2002/0130003 A1 | 9/2002 | Lisenker et al. | |
| 2002/0180166 A1 * | 12/2002 | Voss | B62K 21/02 280/5.5 |
| 2002/0185581 A1 | 12/2002 | Trask et al. | |
| 2002/0187867 A1 | 12/2002 | Ichida et al. | |
| 2003/0001346 A1 | 1/2003 | Hamilton et al. | |
| 2003/0001358 A1 | 1/2003 | Becker et al. | |
| 2003/0034697 A1 | 2/2003 | Goldner et al. | |
| 2003/0040348 A1 | 2/2003 | Martens et al. | |
| 2003/0051954 A1 | 3/2003 | Sendrea | |
| 2003/0054327 A1 | 3/2003 | Evensen et al. | |
| 2003/0065430 A1 | 4/2003 | Lu et al. | |
| 2003/0075403 A1 | 4/2003 | Dernebo | |
| 2003/0103651 A1 | 6/2003 | Novak | |
| 2003/0128275 A1 | 7/2003 | Maguire | |
| 2003/0160369 A1 | 8/2003 | Laplante et al. | |
| 2003/0191567 A1 | 10/2003 | Gentilcore | |
| 2003/0216845 A1 | 11/2003 | Williston | |
| 2004/0004659 A1 | 1/2004 | Foote et al. | |
| 2004/0017455 A1 | 1/2004 | Kremers et al. | |
| 2004/0021754 A1 | 2/2004 | Kremers et al. | |
| 2004/0075350 A1 * | 4/2004 | Kuhnel | F16F 1/12 310/80 |
| 2004/0091111 A1 | 5/2004 | Levy et al. | |
| 2004/0099312 A1 | 5/2004 | Boyer et al. | |
| 2004/0103146 A1 | 5/2004 | Park | |
| 2004/0172178 A1 | 9/2004 | Takeda et al. | |
| 2004/0208687 A1 | 10/2004 | Sicz et al. | |
| 2004/0220708 A1 | 11/2004 | Owen et al. | |
| 2004/0220712 A1 | 11/2004 | Takeda et al. | |
| 2004/0222056 A1 | 11/2004 | Fox | |
| 2004/0256778 A1 | 12/2004 | Verriet | |
| 2005/0055156 A1 | 3/2005 | Maltagliati et al. | |
| 2005/0077131 A1 | 4/2005 | Russell | |
| 2005/0098401 A1 | 5/2005 | Hamilton et al. | |
| 2005/0107216 A1 | 5/2005 | Lee et al. | |
| 2005/0110229 A1 | 5/2005 | Kimura et al. | |
| 2005/0121269 A1 | 6/2005 | Namuduri | |
| 2005/0173849 A1 | 8/2005 | Vandewal | |
| 2005/0195094 A1 | 9/2005 | White | |
| 2005/0199455 A1 | 9/2005 | Browne et al. | |
| 2005/0216186 A1 | 9/2005 | Dorfman et al. | |

(56) References Cited

U.S. PATENT DOCUMENTS

| | | |
|---|---|---|
| 2005/0227798 A1 | 10/2005 | Ichida et al. |
| 2005/0239601 A1 | 10/2005 | Thomas |
| 2005/0288154 A1 | 12/2005 | Lee et al. |
| 2006/0040793 A1 | 2/2006 | Martens et al. |
| 2006/0064223 A1 | 3/2006 | Voss |
| 2006/0065496 A1 | 3/2006 | Fox |
| 2006/0066074 A1 | 3/2006 | Turner et al. |
| 2006/0076757 A1 | 4/2006 | Bromley |
| 2006/0081431 A1 | 4/2006 | Breese et al. |
| 2006/0096817 A1 | 5/2006 | Norgaard et al. |
| 2006/0113834 A1 | 6/2006 | Hanawa |
| 2006/0124414 A1 | 6/2006 | Hanawa |
| 2006/0136173 A1 | 6/2006 | Case et al. |
| 2006/0137934 A1 | 6/2006 | Kurth |
| 2006/0163551 A1 | 7/2006 | Coenen et al. |
| 2006/0163787 A1 | 7/2006 | Munster et al. |
| 2006/0175792 A1 | 8/2006 | Sicz et al. |
| 2006/0176216 A1 | 8/2006 | Hipskind |
| 2006/0185951 A1 | 8/2006 | Tanaka |
| 2006/0213082 A1 | 9/2006 | Meschan |
| 2006/0219503 A1 | 10/2006 | Kim |
| 2006/0225976 A1 | 10/2006 | Nakadate |
| 2006/0237272 A1 | 10/2006 | Huang |
| 2006/0253210 A1 | 11/2006 | Rosenberg |
| 2006/0289258 A1 | 12/2006 | Fox |
| 2007/0006489 A1 | 1/2007 | Case et al. |
| 2007/0007743 A1 | 1/2007 | Becker et al. |
| 2007/0008096 A1 | 1/2007 | Tracy |
| 2007/0021885 A1 | 1/2007 | Soehren |
| 2007/0032981 A1 | 2/2007 | Merkel et al. |
| 2007/0034464 A1 | 2/2007 | Barefoot |
| 2007/0039790 A1 | 2/2007 | Timoney et al. |
| 2007/0051573 A1 | 3/2007 | Norgaard et al. |
| 2007/0070069 A1 | 3/2007 | Samarasekera et al. |
| 2007/0080515 A1 | 4/2007 | McAndrews et al. |
| 2007/0088475 A1 | 4/2007 | Nordgren et al. |
| 2007/0090518 A1 | 4/2007 | Sauciuc et al. |
| 2007/0119669 A1 | 5/2007 | Anderfaas et al. |
| 2007/0170688 A1 | 7/2007 | Watson |
| 2007/0199401 A1 | 8/2007 | Kawakami et al. |
| 2007/0213126 A1 | 9/2007 | Deutsch et al. |
| 2007/0213150 A1 | 9/2007 | Chattin et al. |
| 2007/0221054 A1* | 9/2007 | Webster ............ F15B 15/1409 91/394 |
| 2007/0239479 A1 | 10/2007 | Arrasvuori et al. |
| 2007/0272458 A1 | 11/2007 | Taniguchi et al. |
| 2008/0006494 A1 | 1/2008 | Vandewal |
| 2008/0009992 A1 | 1/2008 | Izawa et al. |
| 2008/0015089 A1 | 1/2008 | Hurwitz et al. |
| 2008/0018065 A1* | 1/2008 | Hirao ............... B60G 17/021 280/6.157 |
| 2008/0029730 A1 | 2/2008 | Kamo et al. |
| 2008/0041677 A1 | 2/2008 | Namuduri |
| 2008/0059025 A1 | 3/2008 | Furuichi et al. |
| 2008/0067019 A1 | 3/2008 | Jensen et al. |
| 2008/0093820 A1 | 4/2008 | McAndrews |
| 2008/0096726 A1 | 4/2008 | Riley et al. |
| 2008/0099968 A1 | 5/2008 | Schroeder |
| 2008/0108465 A1 | 5/2008 | Ichida |
| 2008/0109158 A1 | 5/2008 | Huhtala et al. |
| 2008/0116622 A1 | 5/2008 | Fox |
| 2008/0119330 A1 | 5/2008 | Chiang et al. |
| 2008/0163718 A1 | 7/2008 | Chiang |
| 2008/0185244 A1 | 8/2008 | Maeda et al. |
| 2008/0200310 A1 | 8/2008 | Tagliabue |
| 2008/0250844 A1 | 10/2008 | Gartner |
| 2008/0254944 A1 | 10/2008 | Muri et al. |
| 2008/0303320 A1 | 12/2008 | Schranz et al. |
| 2008/0312799 A1 | 12/2008 | Miglioranza |
| 2008/0314706 A1 | 12/2008 | Lun et al. |
| 2009/0001684 A1 | 1/2009 | McAndrews et al. |
| 2009/0020382 A1 | 1/2009 | Van Weelden et al. |
| 2009/0038897 A1 | 2/2009 | Murakami |
| 2009/0048070 A1 | 2/2009 | Vincent et al. |
| 2009/0069972 A1 | 3/2009 | Templeton et al. |
| 2009/0070037 A1 | 3/2009 | Templeton et al. |
| 2009/0071773 A1 | 3/2009 | Lun |
| 2009/0098981 A1 | 4/2009 | Del et al. |
| 2009/0102628 A1* | 4/2009 | Takebayashi ......... B62M 25/08 340/432 |
| 2009/0118100 A1 | 5/2009 | Oliver et al. |
| 2009/0121398 A1 | 5/2009 | Inoue |
| 2009/0131224 A1 | 5/2009 | Yuen |
| 2009/0171532 A1 | 7/2009 | Ryan et al. |
| 2009/0192673 A1* | 7/2009 | Song .................... G06F 3/04847 701/37 |
| 2009/0200126 A1 | 8/2009 | Kondo et al. |
| 2009/0236807 A1 | 9/2009 | Wootten et al. |
| 2009/0258710 A1 | 10/2009 | Quatrochi et al. |
| 2009/0261542 A1* | 10/2009 | McIntyre ............. B60G 17/021 280/6.157 |
| 2009/0277736 A1 | 11/2009 | McAndrews et al. |
| 2009/0288924 A1 | 11/2009 | Murray et al. |
| 2009/0294231 A1 | 12/2009 | Carlson et al. |
| 2009/0302558 A1 | 12/2009 | Shirai |
| 2009/0324327 A1 | 12/2009 | McAndrews et al. |
| 2010/0004097 A1 | 1/2010 | D'Eredita |
| 2010/0010709 A1* | 1/2010 | Song .................... B62M 25/08 701/37 |
| 2010/0032254 A1 | 2/2010 | Anderfaas et al. |
| 2010/0044975 A1 | 2/2010 | Yablon et al. |
| 2010/0059964 A1 | 3/2010 | Morris |
| 2010/0066051 A1 | 3/2010 | Haugen |
| 2010/0109277 A1 | 5/2010 | Furrer |
| 2010/0133764 A1 | 6/2010 | Greaves |
| 2010/0139442 A1 | 6/2010 | Tsumiyama |
| 2010/0147640 A1 | 6/2010 | Jones et al. |
| 2010/0160014 A1 | 6/2010 | Galasso et al. |
| 2010/0164705 A1 | 7/2010 | Blanchard |
| 2010/0170760 A1 | 7/2010 | Marking |
| 2010/0186836 A1 | 7/2010 | Yoshihiro et al. |
| 2010/0198453 A1 | 8/2010 | Dorogusker et al. |
| 2010/0207351 A1 | 8/2010 | Klieber et al. |
| 2010/0224454 A1 | 9/2010 | Chen et al. |
| 2010/0244340 A1 | 9/2010 | Wootten et al. |
| 2010/0252972 A1 | 10/2010 | Cox et al. |
| 2010/0271191 A1* | 10/2010 | de Graff ............. B60C 23/0408 340/447 |
| 2010/0276238 A1 | 11/2010 | Crasset |
| 2010/0276906 A1* | 11/2010 | Galasso ............. B60G 17/0165 280/283 |
| 2010/0308516 A1* | 12/2010 | Galasso ............. B60G 17/0432 267/64.15 |
| 2010/0308628 A1 | 12/2010 | Hsu et al. |
| 2010/0314917 A1 | 12/2010 | Hsieh et al. |
| 2010/0327542 A1* | 12/2010 | Hara .................... B62K 25/04 280/5.503 |
| 2011/0067965 A1 | 3/2011 | McAndrews |
| 2011/0086686 A1 | 4/2011 | Avent et al. |
| 2011/0095507 A1 | 4/2011 | Planiei et al. |
| 2011/0097139 A1 | 4/2011 | Hsu et al. |
| 2011/0109060 A1* | 5/2011 | Earle ..................... B62K 25/28 280/283 |
| 2011/0127706 A1 | 6/2011 | Sims et al. |
| 2011/0174582 A1 | 7/2011 | Wootten et al. |
| 2011/0202236 A1* | 8/2011 | Galasso ................ F16F 9/3264 701/37 |
| 2011/0204201 A1 | 8/2011 | Kodama et al. |
| 2011/0214956 A1 | 9/2011 | Marking |
| 2011/0224901 A1* | 9/2011 | Aben .................. G08G 1/096811 701/532 |
| 2011/0232147 A1* | 9/2011 | Zoellner ............... F41C 9/085 42/1.01 |
| 2011/0257848 A1 | 10/2011 | Shirai |
| 2011/0284333 A1 | 11/2011 | Krog et al. |
| 2011/0315494 A1 | 12/2011 | Marking |
| 2012/0006949 A1 | 1/2012 | Laird et al. |
| 2012/0007327 A1 | 1/2012 | Talavasek |
| 2012/0018263 A1 | 1/2012 | Marking |
| 2012/0018264 A1 | 1/2012 | King |
| 2012/0048665 A1 | 3/2012 | Marking |
| 2012/0080279 A1 | 4/2012 | Galasso et al. |
| 2012/0166044 A1 | 6/2012 | Battlogg et al. |

(56) References Cited

U.S. PATENT DOCUMENTS

| | | |
|---|---|---|
| 2012/0181126 A1 | 7/2012 | De Kock |
| 2012/0222927 A1 | 9/2012 | Marking |
| 2012/0228906 A1 | 9/2012 | McAndrews et al. |
| 2012/0253599 A1 | 10/2012 | Shirai |
| 2012/0253600 A1 | 10/2012 | Ichida et al. |
| 2012/0265414 A1 | 10/2012 | Cheng |
| 2012/0274043 A1 | 11/2012 | Lee et al. |
| 2012/0305350 A1 | 12/2012 | Ericksen et al. |
| 2012/0312648 A1 | 12/2012 | Yu et al. |
| 2013/0001030 A1 | 1/2013 | Goldasz et al. |
| 2013/0020748 A1* | 1/2013 | Kohlhauser ........ B60G 17/0157 267/217 |
| 2013/0037361 A1 | 2/2013 | Park et al. |
| 2013/0090195 A1 | 4/2013 | Yamaguchi et al. |
| 2013/0119634 A1 | 5/2013 | Camp et al. |
| 2013/0144489 A1* | 6/2013 | Galasso ............... B60G 17/019 701/37 |
| 2013/0168195 A1 | 7/2013 | Park et al. |
| 2013/0221713 A1 | 8/2013 | Pelot et al. |
| 2013/0292218 A1 | 11/2013 | Ericksen et al. |
| 2013/0333993 A1 | 12/2013 | Yu |
| 2014/0008160 A1 | 1/2014 | Marking et al. |
| 2014/0027219 A1 | 1/2014 | Marking et al. |
| 2014/0048365 A1 | 2/2014 | Kim |
| 2014/0061419 A1 | 3/2014 | Wehage et al. |
| 2015/0073656 A1 | 3/2015 | Takamoto et al. |
| 2015/0081171 A1 | 3/2015 | Ericksen et al. |
| 2015/0197308 A1 | 7/2015 | Butora et al. |
| 2015/0291248 A1 | 10/2015 | Fukao et al. |
| 2016/0031506 A1 | 2/2016 | Lloyd et al. |
| 2016/0153516 A1 | 6/2016 | Marking |
| 2016/0185178 A1 | 6/2016 | Galasso et al. |
| 2016/0265615 A1 | 9/2016 | Marking |
| 2016/0290431 A1 | 10/2016 | Marking |
| 2016/0319899 A1 | 11/2016 | Franklin et al. |
| 2016/0355226 A1 | 12/2016 | Pelot et al. |
| 2017/0008363 A1 | 1/2017 | Ericksen et al. |
| 2017/0136843 A1 | 5/2017 | Marking |
| 2017/0184174 A1 | 6/2017 | Marking |
| 2017/0247072 A1 | 8/2017 | Laird et al. |
| 2017/0259876 A1 | 9/2017 | Ericksen et al. |
| 2017/0282669 A1 | 10/2017 | Cox et al. |
| 2017/0291466 A1 | 10/2017 | Tong |
| 2018/0010666 A1 | 1/2018 | Marking |
| 2018/0031071 A1 | 2/2018 | Marking |
| 2018/0222541 A1 | 8/2018 | Madau et al. |
| 2018/0304149 A1 | 10/2018 | Galasso et al. |
| 2018/0326808 A1 | 11/2018 | Ericksen et al. |
| 2018/0328442 A1 | 11/2018 | Galasso et al. |
| 2018/0328446 A1 | 11/2018 | Ericksen et al. |
| 2018/0334007 A1 | 11/2018 | Ericksen et al. |
| 2018/0334008 A1 | 11/2018 | Ericksen et al. |
| 2018/0335102 A1 | 11/2018 | Haugen |
| 2018/0339565 A1 | 11/2018 | Ericksen et al. |
| 2018/0339566 A1 | 11/2018 | Ericksen et al. |
| 2018/0339567 A1 | 11/2018 | Ericksen et al. |
| 2018/0355946 A1 | 12/2018 | Ericksen et al. |
| 2019/0030975 A1 | 1/2019 | Galasso et al. |
| 2019/0031264 A1 | 1/2019 | Laird et al. |
| 2019/0032745 A1 | 1/2019 | Marking |
| 2019/0249769 A1 | 8/2019 | Hamed |
| 2019/0263474 A1 | 8/2019 | Hamed |
| 2019/0301598 A1 | 10/2019 | Sonenthal |
| 2020/0191227 A1 | 6/2020 | Laird |

FOREIGN PATENT DOCUMENTS

| | | |
|---|---|---|
| DE | 3711442 A1 | 10/1988 |
| DE | 3738048 A1 | 5/1989 |
| DE | 3924166 C1 | 2/1991 |
| DE | 4029090 A1 | 3/1992 |
| DE | 4406918 A1 | 9/1994 |
| DE | 202004005229 U1 | 8/2004 |
| DE | 10326675 A1 | 12/2004 |
| DE | 102005025811 A1 | 12/2006 |
| DE | 102007063365 A1 | 7/2009 |
| DE | 202008015968 U1 | 4/2010 |
| DE | 202010012738 U1 | 12/2010 |
| EP | 207409 A2 | 1/1987 |
| EP | 304801 A2 | 3/1989 |
| EP | 552568 A1 | 7/1993 |
| EP | 1050696 A2 | 11/2000 |
| EP | 1138530 A2 | 10/2001 |
| EP | 1188661 A2 | 3/2002 |
| EP | 1241087 A1 | 9/2002 |
| EP | 1355209 A1 | 10/2003 |
| EP | 1394439 A1 | 3/2004 |
| EP | 1449688 A2 | 8/2004 |
| EP | 1623856 A2 | 2/2006 |
| EP | 1757473 A2 | 2/2007 |
| EP | 1825220 A2 | 8/2007 |
| EP | 2103512 A2 | 9/2009 |
| EP | 2189191 A2 | 5/2010 |
| EP | 2248691 A1 | 11/2010 |
| EP | 2357098 A2 | 8/2011 |
| EP | 2410203 A2 | 1/2012 |
| EP | 2479095 A2 | 7/2012 |
| EP | 2495472 A2 | 9/2012 |
| EP | 2357098 B1 | 10/2014 |
| EP | 2848582 A1 | 3/2015 |
| FR | 2432424 A1 | 2/1980 |
| FR | 2529002 A2 | 12/1983 |
| FR | 2617928 A1 | 1/1989 |
| FR | 2952031 A1 | 5/2011 |
| GB | 2104183 A | 3/1983 |
| GB | 2159604 A | 12/1985 |
| GB | 2180320 A | 3/1987 |
| GB | 2289111 A | 11/1995 |
| JP | 57173632 A | 10/1982 |
| JP | 57173632 U | 11/1982 |
| JP | 57182506 A | 11/1982 |
| JP | 01106721 A | 4/1989 |
| JP | H01 93637 A | 4/1989 |
| JP | H02168038 A | 6/1990 |
| JP | H03113139 A | 5/1991 |
| JP | 04203540 A | 7/1992 |
| JP | 05149364 A | 6/1993 |
| JP | 06101735 A | 4/1994 |
| JP | 06185562 A | 7/1994 |
| JP | H084818 A | 1/1996 |
| JP | 2005119548 A | 5/2005 |
| JP | 2005119549 A | 5/2005 |
| JP | 2007302211 A | 11/2007 |
| JP | 2008238921 A | 10/2008 |
| KR | 20070076226 A | 7/2007 |
| WO | 9840231 A2 | 9/1998 |
| WO | 99/06231 | 2/1999 |
| WO | 0027658 A1 | 5/2000 |
| WO | 03070546 A1 | 8/2003 |
| WO | 2007017739 A2 | 2/2007 |
| WO | 2007117884 A2 | 10/2007 |
| WO | 2008086605 A1 | 7/2008 |
| WO | 2008114445 A1 | 9/2008 |

OTHER PUBLICATIONS

English language abstract for EP 0207409 (no date).
European Search Report for European Application No. 19155995, 11 pages, dated Aug. 28, 2019.
Fachkunde Fahrradtechnik 4 Auflage, Gressmann_Inhaltv und S, 2011, 206-207.
Statement of Grounds of Appeal, EP App. No. 11153607.4, May 28, 2018, 88 Pages.
European Search Report, European Patent Application No. 14189773.6, dated May 4, 2015, 4 Pages.
Grounds of Appeal, EP App. No. 11153607.4, Jun. 1, 2018, 28 Pages.
EP Search Report for European Application No. 15163428.4, dated Jul. 3, 2017, 7 Pages.
"17 Years of Innovation and Still Evolving", https://www.powertap.com/post/blog-15-17-years-of-innovation-and-still-avolving, Nov. 28, 2018, 8 Pages.

(56) References Cited

OTHER PUBLICATIONS

"ANT Message Protocol and Usage", Dynastream Innovations, Inc., Jul. 2, 2007, 68 Pages.
"Basis For Claims Filed 23.01.15", European Patent Application No. 14189773.6, 2 Pages.
"Communication Re Oral Proceedings for European Application No. 10161906, dated Feb. 15, 2013 (Feb. 15, 2013)".
"European Patent Office Final Decision dated Mar. 21, 2013", European Patent Application No. 10161906.2.
"European Search Report for European Application No. 09177128, 4 pages, dated Aug. 25, 2010 (Aug. 25, 2010)".
"European Search Report for European Application No. 10161906, 3 pages, dated Sep. 15, 2010 (Sep. 15, 2010)".
"European Search Report for European Application No. 10187320, 12 pages, dated Sep. 25, 2017 (Sep. 25, 2017)".
"European Search Report for European Application No. 11153607, 3 pages, dated Aug. 10, 2012 (Aug. 10, 2012))".
"European Search Report for European Application No. 11172553, 2 pages, dated Sep. 25, 2017 (Sep. 25, 2017)".
"European Search Report for European Application No. 11172612, 2 pages, dated Oct. 6, 2011 (Oct. 6, 2011))".
"European Search Report for European Application No. 11175126, 2 pages, dated Sep. 25, 2017 (Sep. 25, 2017)".
"European Search Report for European Application No. 11275170, 2 pages, dated Jan. 10, 2018 (Jan. 10, 2018)".
"European Search Report for European Application No. 12170370, 2 pages, dated Nov. 15, 2017 (Nov. 15, 2017)".
"European Search Report for European Application No. 12184150, 10 pages, dated Dec. 12, 2017 (Dec. 12, 2017)".
"European Search Report for European Application No. 13158034, 4 pages, dated Jun. 28, 2013 (Jun. 28, 2013))".
"European Search Report for European Application No. 13174817. 0, 13 pages, dated Jan. 8, 2018 (Jan. 8, 2018))".
"European Search Report for European Application No. 13189574, 2 pages, dated Feb. 19, 2014 (Feb. 19, 2014)".
"European Search Report for European Application No. 15167426, 4 pages, dated Sep. 18, 2015 (Sep. 18, 2015))".
"European Search Report for European Application No. 16167306, 2 pages, dated Mar. 23, 2017 (Mar. 23, 2017)".
"European Search Report for European Application No. 17154191, 2 pages, dated Jun. 28, 2017 (Jun. 28, 2017)".
"European Search Report for European Application No. 17188022, 9 pages, dated Feb. 1, 2018 (Feb. 1, 2018))".
"European Search Report and Written Opinion, European Patent Application No. 13165362.8", dated Sep. 24, 2014, 6 Pages.
"European Search Report for EP Application No. 18154672, 3 pages, dated Aug. 28, 2018 (Aug. 28, 2018))".
"Office Action for European Application No. 13158034.2, 5 pages, dated May 22, 2014".
Healey, "The Tyre as Part of the Suspension System", The Institution of Automobile Engineers, Nov. 1924, 26-128.
Kasprzak, "Understanding Your Dampers: A guide from Jim Kasprzak", http://www.kaztechnologies.com/downloads/kaz-tech-tips/ Accessed: Oct. 24, 2018, 25 pages.
Litchfield, "Pneumatic Tires", Transactions (Society of Automobile Engineers), vol. 8, Part II, 1913, 208-223.
Nilsson, "Opposition Letter Against EP-2357098", Oct. 13, 2017, 7.
Puhn, "How to Make Your Car Handle", HPBooks, 1981, 7 Pages.
Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.
Smith, ""The Bump Stop" in Engineer to win—Chapter 13: Springs and Shock Absorbers", MBI Publishing Company and Motorbooks, USAXP055430818, ISBN: 978-0-87938-186-8, Dec. 31, 1984, 207.
Thum, Notice of Opposition to a European Patent, EP App. No. 14189773.6, dated Dec. 13, 2018, 49 Pages.
Thum, "Oppostion Letter Against EP2357098", Oct. 16, 2018, 39.
Thum, "Oppostion Letter Against EP2357098", Dec. 17, 2019, 25 Pages.
Waechter, et al., "A Multibody Model for the Simulation of Bicycle Suspension Systems", Vehicle System Dynamics, vol. 37, No. 1, 2002, 3-28.
European Search Report for European Application No. 21170685.8, dated Nov. 10, 2021, 8 Pages.

\* cited by examiner

METHODS AND APPARATUS FOR SELECTIVE SPRING PRE-LOAD ADJUSTMENT

CROSS-REFERENCE TO RELATED APPLICATIONS

This application claims priority to and is a continuation of the co-pending patent application, U.S. patent application Ser. No. 15/623,914, filed on Jun. 15, 2017, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The application Ser. No. 15/623,914 claims priority to and is a continuation of the patent application, U.S. patent application Ser. No. 14/853,566, filed on Sep. 14, 2015, now U.S. Pat. No. 9,682,604, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The application Ser. No. 14/853,566 claims priority to and is a continuation of the patent application, U.S. patent application Ser. No. 12/727,915, filed on Mar. 19, 2010, now U.S. Pat. No. 9,140,325, entitled "METHODS AND APPARATUS FOR SELECTIVE SPRING PRE-LOAD ADJUSTMENT", by Christopher Paul Cox et al., and assigned to the assignee of the present invention, the disclosure of which is hereby incorporated herein by reference in its entirety.

The U.S. patent application Ser. No. 12/727,915 claims priority to and benefit of U.S. Provisional Patent Application No. 61/161,620, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

The U.S. patent application Ser. No. 12/727,915 claims priority to and benefit of U.S. Provisional Patent Application No. 61/161,552, filed on Mar. 19, 2009, entitled "METHODS AND APPARATUS FOR SELECTIVE SPRING PRE-LOAD ADJUSTMENT" by Christopher Paul Cox et al., which is incorporated herein, in its entirety, by reference.

BACKGROUND OF THE INVENTION

Field of the Invention

Embodiments of the present invention generally relate to a user-adjustable spring for use in a shock absorber.

Description of the Related Art

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614; 5,803,443; 5,553,836; and 7,293,764; each of which is herein incorporated, in its entirety, by reference.

The spring mechanism of many shock absorbers is adjustable so that it can be preset to varying initial states of compression. In that way the shock absorber can be adjusted to accommodate heavier or lighter carried weight, or greater or lesser anticipated impact loads. In motorcycle racing, particularly off-road racing, shock absorbers may be adjusted according to certain rider preferences.

U.S. Pat. No. 5,044,614 ("the '614 patent") shows a damper body carrying a thread 42. A helical spring 18 surrounds the damper body where the two form an integrated shock absorber. The compression in the helical spring 18 may be pre-set by means of a nut 48 and a lock nut 50. Because the nut 48 and lock nut 50 must be relatively torqued to prevent nut 50 rotation upon final adjustment, the shock absorber must typically be removed from its vehicle in order to allow torquing wrench access. Once the spring 18 is in a desired state of compression, lock nut 50 is rotated, using a wrench, up against nut 48 and tightened in a binding relation therewith.

The system described in the '614 patent requires that the user be able to access a large amount of the circumference of the shock absorber, and specifically the nut 48 and lock nut 50, with a wrench (e.g. col. 4, lines 15-17). Unfortunately many shock absorbers, as mounted on a corresponding vehicle, are fairly inaccessible, and have limited surrounding wrench space because of other surrounding vehicle hardware and/or, as in the instant case, a separate damping fluid reservoir or "piggyback." What is needed is a shock absorber having a spring that can be readily adjusted while the shock absorber is mounted on a vehicle. What is needed is a motorcycle "monoshock" having a spring that can be easily adjusted without removing the shock from the motorcycle. What is needed is a shock absorber having a spring where the state of spring adjustment is constantly indicated and easily visible while the shock is mounted on a vehicle.

SUMMARY

The present invention generally relates to a suspension comprising a spring assembly having a threaded member at a first end for imposing axial movement in the spring as the spring is rotated and thereby rotating the threaded member relative to a second component. In one embodiment, the system includes a damper for metering damping fluid and a rotatable spring member coaxially disposed around the damper and rotatable relative to the damper. In one embodiment an adjustment assembly includes a spring adjustment nut (e.g. follower nut) and clamp with the adjustment nut disposed on a threaded portion of the second component. When the clamp is loosened, the adjustment or "follower" nut rotates with the spring which is rotated by a user and the rotation thereby compresses or decompresses the spring as the nut moves axially (by thread pitch) along the threaded second component. In one embodiment, the clamp includes an indicator that cooperates with markings on the second component to indicate the compression state of the spring.

BRIEF DESCRIPTION OF THE DRAWINGS

So that the manner in which the above recited features of the present invention can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
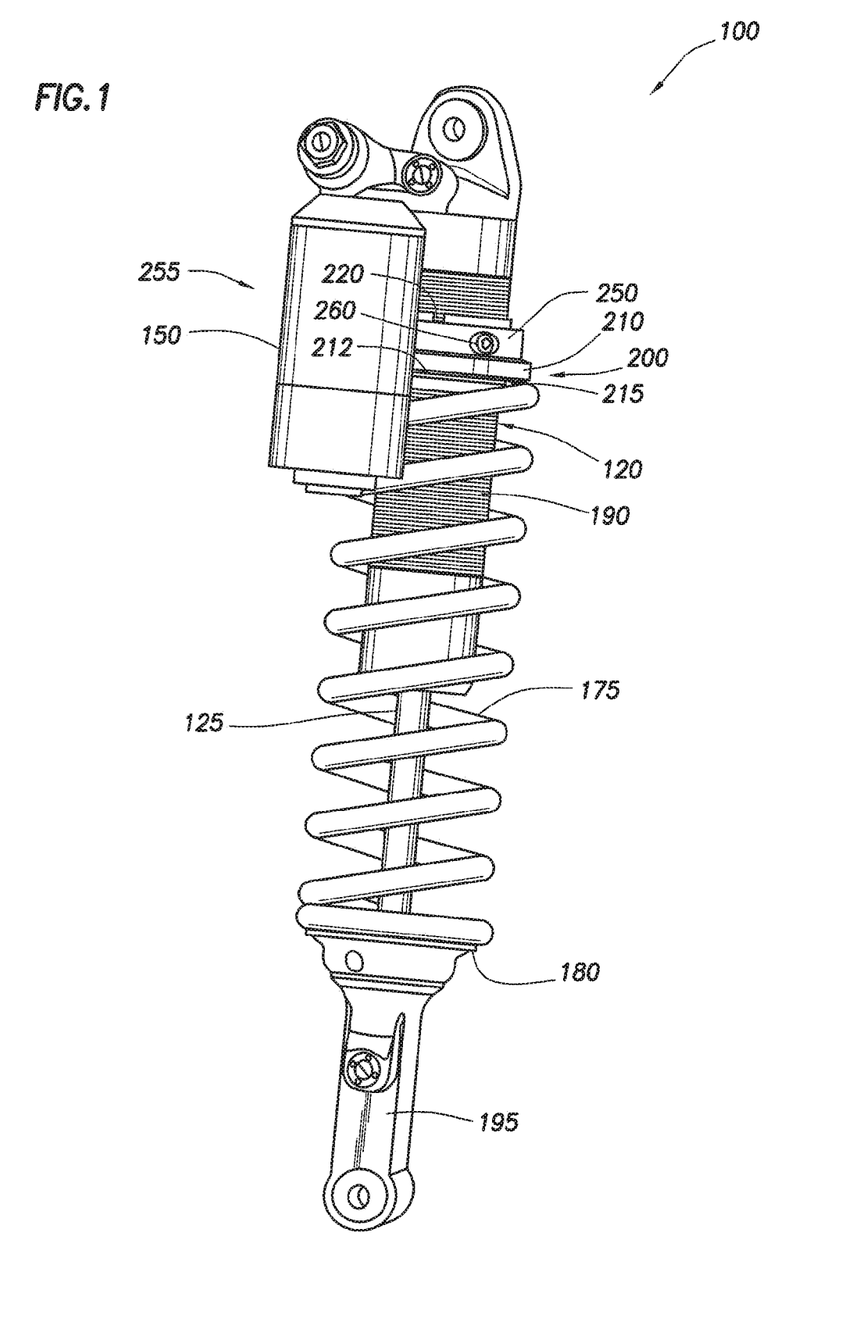
FIG. 1 is a perspective view of a shock absorber having a user-adjustable spring.

FIG. 1 shows an embodiment of a reservoir type shock absorber 100. The shock absorber includes a second component, such as in this embodiment a damper body 120, with a rod 125 extending therefrom and a reservoir 150 is in fluid (e.g. damping fluid such as hydraulic oil) communication with the damper body 120. The shock further includes a helical spring 175 annularly disposed about the damper body 120 and captured axially between a bottom clip 180 at a lower end and an adjuster assembly 200 at an upper end. An outer surface of the damper body 120 includes threads 190 that facilitate rotation of nut 210 and corresponding axial movement of the adjuster assembly 200 relative to the body 120.

One embodiment of the adjuster assembly 200 is best appreciated with reference to all of the Figures and comprises a follower nut 210 and a clamp 250. In one embodiment the follower nut 210 includes a pin 215 for fitting into a hole 216 (shown in FIG. 2) in a flange of the nut 210. Referring to FIG. 3, the pin 215 rotationally indexes the follower nut 210 to the spring 175 at an interface 300 between an abrupt end 470 of the wound wire and an upwardly inclined upper surface of the same wound wire in the coil preceding (i.e. directly underneath) the abrupt end 470 of the helical spring 175. In one embodiment, pin 215 extends axially (i.e. parallel to the longitudinal axis of the shock absorber 100) downward from follower nut 210 and extends into the interface space 300. Due to interference between the pin 215 and the abrupt end 470 of spring 175 in one direction (referring to FIG. 3) and the helical angle of the spring wire in the other direction where the end and the angle combined form an axial recess at an upper end of the spring 175, rotation of the spring 175 will interfere with the pin (or key or tooth) 215 and impart a rotational force (via the pin 215) to the follower nut 210. Conversely, rotation of the follower nut 210 will carry the pin 215 and a rotational force will be correspondingly transmitted to the spring 175. In one embodiment (not shown) an upper portion of the spring 175 adjacent the abrupt end 470 is tapered to increase the surface contact between the spring and a lower end of the follower nut 210 (i.e. the spring end is ground "flat"). In one embodiment (not shown) the flattened last coil portion of the upper end of the spring includes an axial hole drilled therein for receiving the portion of pin 215 that protrudes from hole 216. In one embodiment the upper end of the spring is castellated and the lower surface 212 of the nut 210 is castellated such that the castellations of the nut and the spring are interengageable for rotationally fixing the nut 210 to the spring 175. In one embodiment, the nut 210 includes a ratcheting pawl set on a lower surface thereof and the spring includes suitable beveled one way castellations on an upper surface thereof (or vice versa) and the spring and the nut are therefore rotationally engaged in one rotational direction only (depending on the sense of the ratchet set) and relatively freely rotatable in the other rotational direction. In one embodiment, the spring 175 is rotatable in relation to the bottom clip 180. In another embodiment the bottom clip 180 is bearing-mounted (e.g. with a race of ball bearings disposed between a lower end of the spring and an upward facing surface of the bottom clip 180 in axially abutting relation to each) to a shock mount 195 and thereby facilitates easier rotation of the spring 175 relative to the damper body 120 (by reducing the relative apparent coefficient of friction between the bottom clip and the lower end of the spring). In one embodiment, the spring comprises a plurality of springs axially abutted one with another where each of the springs has a different spring rate. In one embodiment, at least one spring of a shock absorber is wound having a compound spring rate. It is worth noting that as the spring 175 is placed in greater states of compression, the friction force between the spring 175 and its axial abutments at the clip 180 and the follower nut 210 are increased.

While the follower nut 210 is a separate component in some embodiments, it will be understood that the nut can be integral with the spring 175 whereby one end of the spring is therefore effectively threaded to the damper housing and axially adjustable upon rotation of the spring while an opposite end of the spring is axially fixed but rotationally movable relative to the damper body. In one embodiment, the clamp member can also be formed to simply include a threaded member, for instance, that interacts with the damper body to prevent rotation between the threads of the integral spring/nut/clamp and the threaded damper body. In one embodiment, the bottom portion 180 includes a cylindrical member, or body, (not shown) axially and upwardly disposed within and along the spring 175. In one embodiment the cylindrical member is threaded along an axial exterior length thereof. In one embodiment an adjustment assembly 200 is located between bottom clip or annular "lip" 180 and a lower end of the spring 175. Much as has been previously described in relation to threads 190 and the nut 210, in one embodiment the threads 211 on an inner diameter of nut 210 are engaged with threads on an outer diameter of the cylindrical member (not shown). The pin 215 engages a recess 300 at a lower end of the spring 175. As previously described, rotation of the spring 175 correspondingly rotates the nut 210, via pin 215, and the nut 210 translates axially along the cylindrical member thereby increasing or decreasing the compression in the spring 175 depending on the direction of rotation and the directional "sense" of the threads. In one embodiment the cylindrical member (not shown) has an inner diameter that is larger than the outer dimensions of the spring and is disposed axially upward along the shock and outside of the spring. A nut is threaded on an outer diameter thereof and engaged with an end of the spring and the cylinder is threaded on an inner diameter thereof and the nut, cylinder and spring cooperate as principally described herein to facilitate adjustment of compression in the spring. In one embodiment the spring includes an assembly 200 and corresponding threaded sections (e.g. 190, cylindrical member) at each of its ends. In one embodiment the threads at each end are opposite in "sense" so that rotation of the spring increases or decreases compression in the spring twice as fast as a single threaded end version. In one embodiment threads at one end are of a different pitch than threads at the other end of the spring 175.

Figure 2:
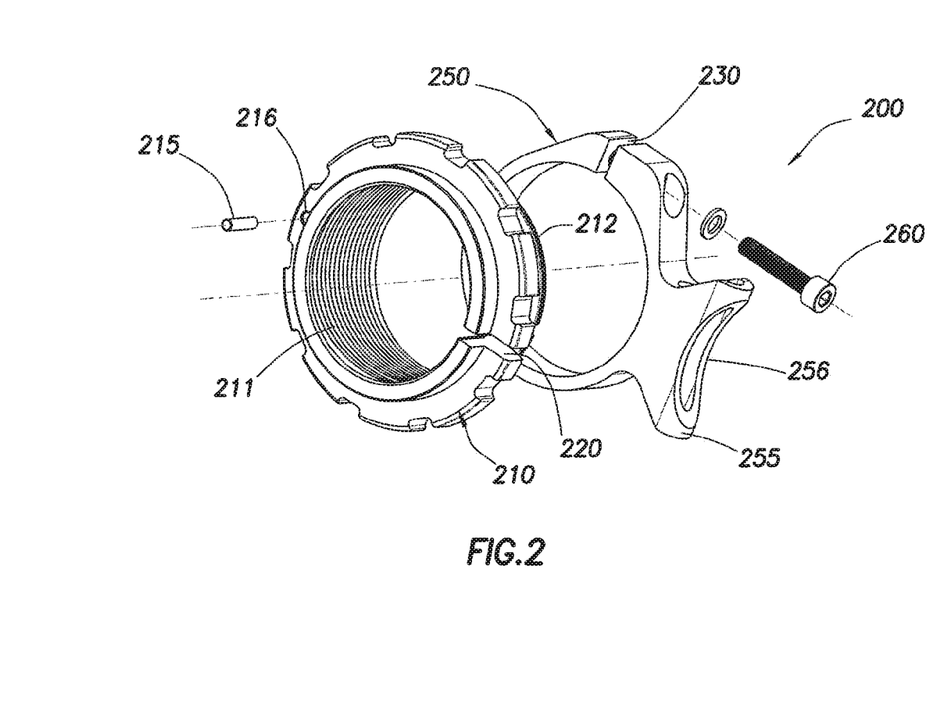
FIG. 2 is an exploded view of a follower nut and clamp, and 2A is a section view thereof.
Figure 2A:
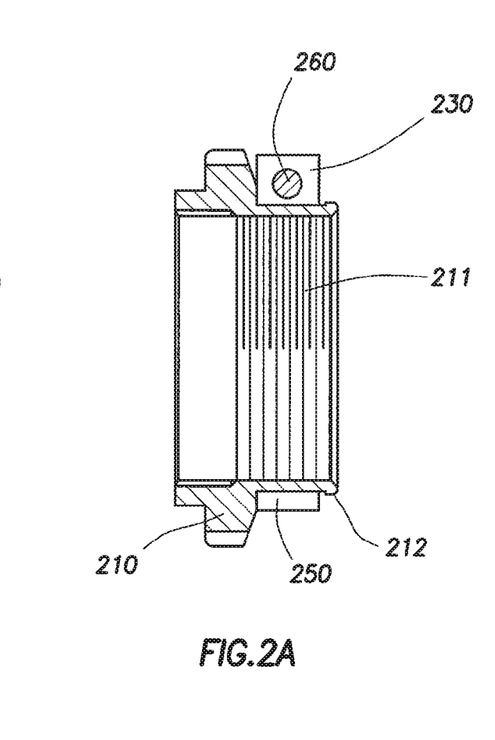
Figure 3:
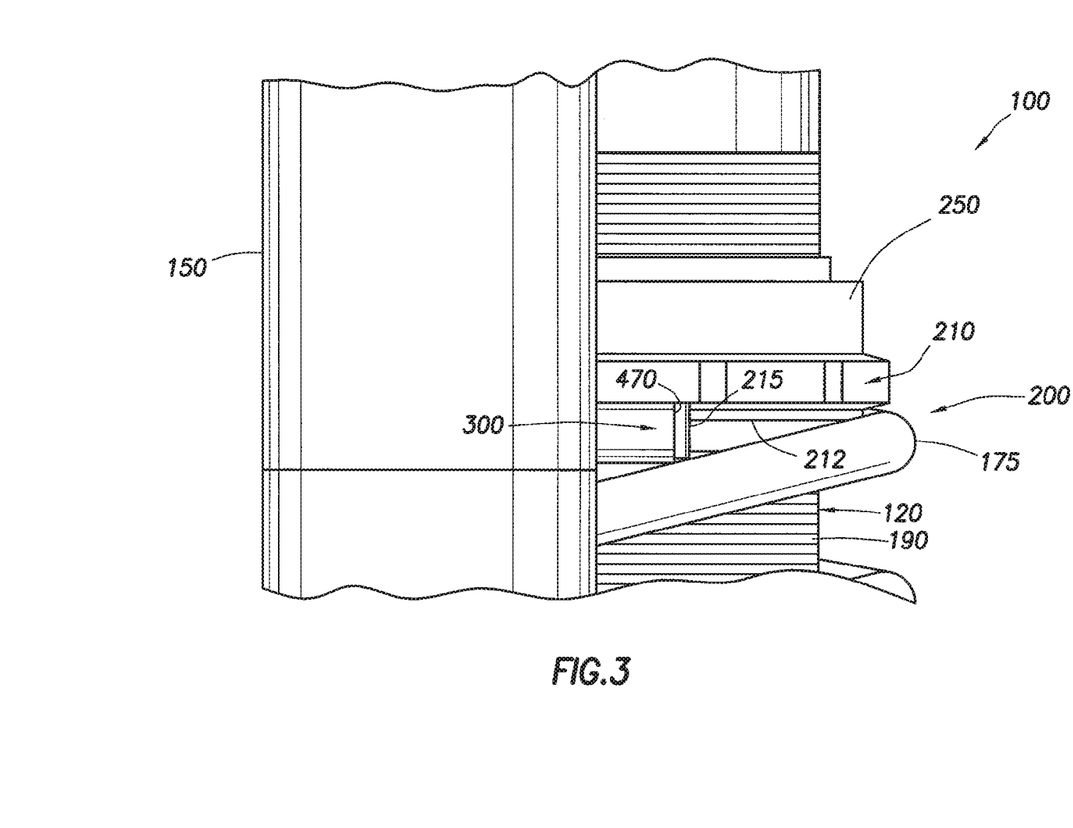
FIG. 3 is an enlarged view showing an interface between the clamp, follower nut and spring.

FIGS. 2 and 2A show details of embodiments of the clamp 250 and follower nut 210. In one embodiment the follower nut 210 is cylindrical (with varying diameters along its length) generally with a cut though or split 220, giving it the form of a "C" ring. The clamp 250 is also in the form of a "C" ring, being generally cylindrical and having its own cut or split 230. As can be seen in FIG. 2A, the clamp 250 fits over the follower nut 210. In one embodiment the clamp 250 is expanded elastically at the split 230 to clear a lip 212 at a smaller-diameter end of the follower nut. Once the clamp 250 has cleared the lip, it is returned to a "relaxed" state surrounding a portion of the nut 210 and is rotationally movable relative thereto. The clamp 250 may then rotate about the follower nut 210 (and the follower nut 110 may rotate within the clamp 250) but the clamp 250 is retained axially on the follower nut 210 by lip 212. In one embodiment a screw 260, with a suitable washer is inserted into the clamp 250 but not tightened until such time as rotational and axial retention of the follower nut 210 on the damper body 120 (e.g. because spring adjustment is complete) is desired. In one embodiment, the adjuster assembly 200, with its nut 210 and clamp 250, is threaded onto threads 190 of body 120, and is moved axially (e.g. by rotation of the threaded (211) nut 210 about threads 190) until an indicator 255 (best seen in FIGS. 2 and 4) formed on the clamp 250 is located adjacent the reservoir 150. In one embodiment a curved surface 256 of the indicator 255, corresponding generally to the curved shape of the reservoir body is aligned with the exterior of the reservoir 150 and the follower nut 210 and clamp 250 may be axially translated further toward a lower end of the shock 100 by rotation of follower nut 210 (while clamp 250 remains aligned with reservoir 150 via indicator 255). Tightening the screw 260 "closes" the C-shaped clamp 250 and correspondingly closes the follower nut 210 thereby preventing the follower nut 210 from rotating on the threaded surface 190 of the damper body 120, and therefore frictionally (e.g. as a clamp) locking the nut 210 to the damper body and thus retaining the user-adjusted compression in the spring 175.

In one embodiment the indicator 255 connected on clamp 250, and rotationally fixed relative to the clamp 250, serves at least two purposes. Its curved surface 256 conforms to a portion of an exterior of the reservoir 150, thereby preventing rotation of the clamp 250 during rotation of the spring 175. As such the orientation of screw 260 is maintained relative to the shock absorber and the vehicle on which the shock absorber is mounted. Correspondingly, the screw 260 is maintained in an accessible location for tightening and loosening to facilitate spring 175 adjustment while the shock absorber remains mounted on the vehicle. Second, the indicator 255 serves to indicate axial compression state of the spring 175 relative to a scale 400 (referring to FIG. 4).

Figure 4:
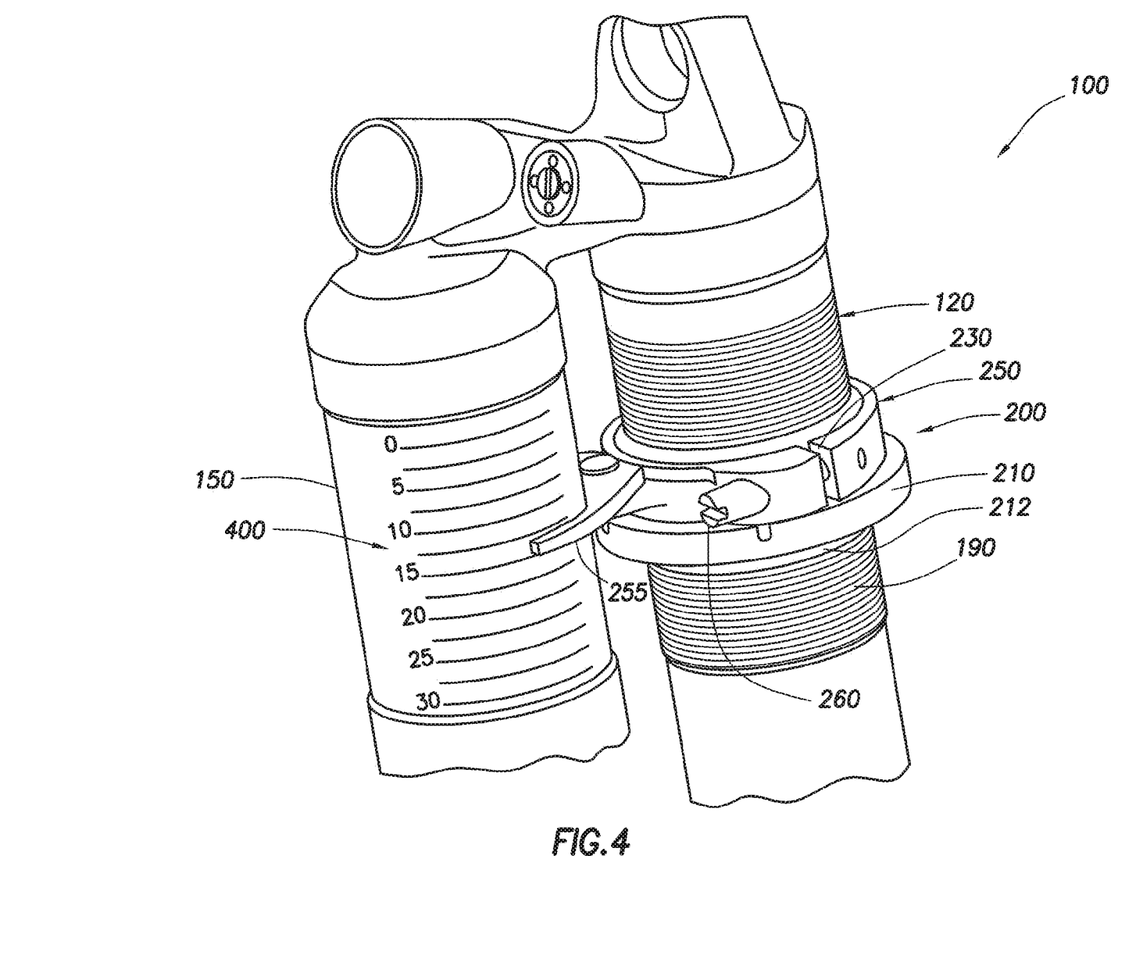
FIG. 4 is a perspective detailed view of the shock absorber.

In one example, the clamp 250 is loosened by inserting an appropriate hex or blade type wrench or screw driver (not shown) through a predetermined shock absorber access space available in the vehicle (vehicle such as a monoshock rear shock motorcycle) and rotating screw 260 counterclockwise (assuming a right hand thread screw 260) to loosen the clamp. Once the clamp 250 is loose, the spring 175 can be manually gripped, through the access space, by a user and rotated manually, for example, in one embodiment having right hand threads 190 from the top axial view of the shock absorber, clockwise as viewed from the upper end, to increase compression or pre-load in the spring 175. In that embodiment rotating the spring 175 counterclockwise as viewed from above reduces pre-load of the spring 175 (or vice versa depending on the sense of threads 190). As previously described, such rotation of the spring 175 causes rotation of the follower nut 210 and corresponding axial translation of the follower nut 210 (based on the pitch of the threads 190) relative to the damper body 120 and along threads 190. Axial movement of the follower nut 210, relative to non-axially moving bottom clip 180, increases or decreases compression pre-load in spring 175. In one embodiment, when the desired pre-load is obtained, as indicated by movement of the indicator 255, which moves axially with the nut 210, relative to the scale 400, the clamp 250 is retightened by rotating screw 260 clockwise. It should be noted that the scale 400 may be placed on any suitable and axially static component relative to the follower nut 210/clamp 250 and the indicator 255 may be structured to "point" appropriately thereto. In one embodiment the numerical markers on the scale 400 are indicative of a percentage of compression preload in the spring. In one embodiment, the scale and indicator are visible from an exterior of an assembled vehicle with the shock absorber having the scale and indictor mounted thereon. In one embodiment, the scale 400 and indicator 255 "pair" comprise a longitudinal wire coil and permanent magnet. Position of the magnet relative to the coil is indicated by a state of current through the coil and can be calibrated to correspond to a state of spring compression. In one embodiment the "scale/indicator" pair comprises a proximity sensor and a datum structure. In one embodiment an electronic "scale/indicator" pair is connected to a transmission circuit having wireless protocol capabilities, such as Garmin's ANT plus, and shock spring compression data is transmitted in real time or in packets to a user interface/output device such as for example Garmin's 705 edge GPS enabled computer. In one embodiment the shock absorber is a monoshock and is accessible and visible, while mounted in a functional position, through a limited access space of the monoshock equipped vehicle.

While the foregoing is directed to certain embodiments of the present invention, other and further embodiments of the invention may be devised without departing from the basic scope thereof, and the scope thereof is determined by the claims that follow.

What we claim is:

1. A suspension system comprising:
a cylindrical body having a threaded portion;
a spring coaxially disposed around said cylindrical body;
an adjuster assembly disposed coaxially around said cylindrical body and coupled to said spring;
a follower nut disposed coaxially around said cylindrical body and coupled to said adjuster assembly, said follower nut disposed in threaded engagement with said threaded portion of said cylindrical body and abutting an end of said spring, said follower nut constructed and arranged to affect compression of said spring while said follower nut translates axially along said threaded portion of said cylindrical body, wherein an axial position of said follower nut is indicated relative to a piggyback reservoir operable with a damper; and
a scale/indicator pair coupled with said piggyback reservoir, said scale/indicator pair operable to indicate an amount of compression of said spring.

2. The suspension system of claim 1 further comprising:
a transmission circuit configured to transmit said amount of compression of said spring to a user device.

3. The suspension system of claim 2 wherein said transmission circuit is configured to transmit said amount of compression of said spring to said user device in real time.

4. A suspension system comprising:
a cylindrical body having a threaded portion;
a spring coaxially disposed around said cylindrical body;
an adjuster assembly disposed coaxially around said cylindrical body and coupled to said spring;
a follower nut disposed coaxially around said cylindrical body and coupled to said adjuster assembly, said follower nut disposed in threaded engagement with said threaded portion of said cylindrical body and abutting an end of said spring, said follower nut constructed and arranged to affect compression of said spring while said follower nut translates axially along said threaded portion of said cylindrical body, wherein an axial position of said follower nut is indicated relative to a piggyback reservoir operable with a damper; and a scale/indicator pair coupled with said piggyback reservoir, said scale/indicator pair operable to indicate an amount of compression of said spring.

5. The suspension system of claim 4 further comprising:
a transmission circuit configured to transmit said amount of compression of said spring to a user device.

6. The suspension system of claim 5 wherein said transmission circuit is configured to transmit said amount of compression of said spring to said user device in real time.

7. A suspension system comprising:
a cylindrical body having a threaded portion;
a spring coaxially disposed around said cylindrical body;
an adjuster assembly disposed coaxially around said cylindrical body and coupled to said spring;
a follower nut disposed coaxially around said cylindrical body and coupled to said adjuster assembly, said follower nut disposed in threaded engagement with said threaded portion of said cylindrical body and abutting an end of said spring, said follower nut constructed and arranged to affect compression of said spring while said follower nut translates axially along said threaded portion of said cylindrical body, wherein an axial position of said follower nut is indicated relative to a piggyback reservoir operable with a damper; and an electronic scale/indicator pair coupled with said piggyback reservoir, said electronic scale/indicator pair operable to indicate an amount of compression of said spring.

8. The suspension system of claim 7 further comprising:
a transmission circuit having wireless protocol capabilities, said transmission circuit coupled to said electronic scale/indicator pair.

9. The suspension system of claim 8 further comprising, said transmission circuit configured to transmit said amount of compression of said spring to a user device.

10. The suspension system of claim 9 wherein said transmission circuit is configured to transmit said amount of compression of said spring to said user device in real time.

* * * * *